Sept. 29, 1931.  B. G. LA BAR  1,824,781
METER DEVICE
Filed Oct. 6, 1930
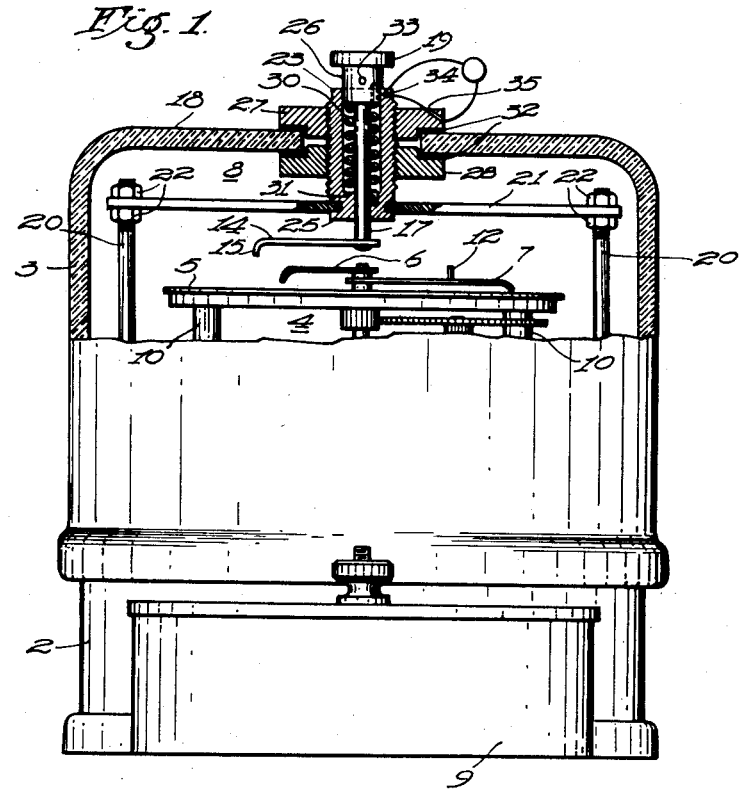
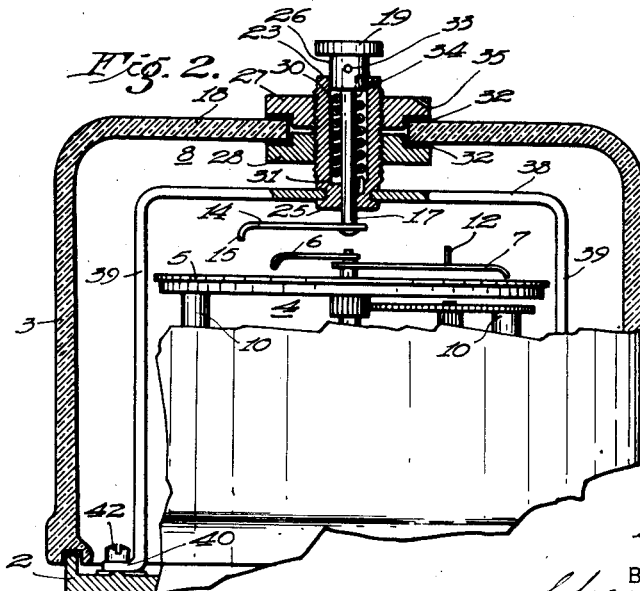
INVENTOR
Bert G. LaBar.
BY
ATTORNEY Patented Sept. 29, 1931

1,824,781

UNITED STATES PATENT OFFICE

BERT G. LA BAR, OF UNION, NEW JERSEY, ASSIGNOR TO WESTINGHOUSE ELECTRIC & MANUFACTURING COMPANY, A CORPORATION OF PENNSYLVANIA

METER DEVICE

Application filed October 6, 1930. Serial No. 486,598.

My invention relates to meter devices and particularly to devices for resetting the demand pointers and securing the covers of meters of the demand type.

One object of my invention is to provide means for controlling or resetting a mechanism element, such as a demand-meter pointer, from a position exterior to a casing enclosing the mechanism, that shall be accurately operative, irrespective of discrepancies between component parts, such as the base and the cover of the casing.

Another object of my invention is to provide a casing cover, such as the glass cover of a watthour-meter casing, and means cooperating therewith that shall reduce the complexity of construction, facilitate the manipulation and lessen the likelihood of breakage of the cover.

Another object of my invention is to combine the features of exteriorly controlling an encased mechanism element and secure a movable or removable casing cover in position by a novel and efficient means.

A further object of my invention is to provide a meter device that shall be simple and durable in construction, economical to manufacture, and effective in its operation.

Heretofore, it has been usual to provide means operating through the wall or cover of a device, such as a watthour-demand-meter casing, to reset or control an element or pointer of the meter or mechanism in the casing.

It has also been usual to secure the casing cover in position by a plurality of means, such as a pair of studs projecting from the casing base through the cover and cooperating with means, such as washers, nuts and seals, outside the casing.

In glass-casing covers, such as those of substantially cup-shape having open end perimeters against the base, there are discrepancies in the depths of the cup, so that variations in relative positions occur between elements cooperating between the closed outer-end wall of the cover and the fixed or invariable parts of the base or the mechanism on the base.

Thus, in a device of the character specified, where there is a scale plate in parallel-plane relation to the front of the meter, and a pointer movable in closely-adjacent parallel-plane relation to the scale plate, any device, such as a reset arm mounted on the cover and turnable parallel to said planes, must be accurately positioned to operate effectively; any substantial variation in the depth of the cover being likely to displace the reset arm away from the pointer, so that the pointer cannot be reset thereby, or toward the scale to engage the latter.

It is my aim to overcome all of the disadvantages of devices of this type from the above-mentioned causes, and, accordingly, in practicing my invention, I so construct and combine the resetting and cover-holding features relative to the other parts with which they cooperate as to ensure accurate assembly of the parts in large-scale production, to simplify the manufacture and manipulation of the covers, to reduce the likelihood of cover breakage and to obtain other advantages incident to the invention.

Figure 1, of the accompanying drawings, is a view, partially in side elevation and partially in section, of a watthour-demand meter embodying my invention, and Fig. 2 is a sectional view illustrating modified forms of portions of the device shown in Fig. 1.

Referring to Fig. 1, the device comprises, in general, a casing including a base 2 and a cover 3, a meter mechanism, indicated generally as 4, disposed in the casing, a scale plate 5, a maximum-demand pointer 6, a demand-pointer 7 and a mechanism 8, of my invention, for resetting the pointer 6 and holding the cover 3 in position.

The base 2 is preferably of metal, of a usual and well-known type employed in watt-hour-demand meters, and includes a terminal-box portion 9.

The cover 3 is also of a type usual in meters of this kind, and, as shown, is of glass and of substantially cup-shape.

The scale plate 5 is supported in any suitable manner, as by standards 10 which may be secured to the base 2.

The maximum-demand pointer 6 is adapted to be advanced by a pin 12 on the demand pointer 7 and to remain in its furthermost-advanced position until returned to its zero position, the demand pointer 7 operating during periodic equal intervals of time, such as fifteen minutes, and being automatically returned to zero position, in a usual and well-known manner.

At the end of a greater period of time, such as a week or a month, it is desirable to return the maximum-demand pointer 6 to zero position so that the maximum demand for the following corresponding greater period may be determined.

For this purpose, and also to hold the cover 3 in position in a novel manner, the device or mechanism 8 of my invention has been provided.

The device 8 comprises an arm 14 having a bent end portion 15 and is mounted on a shaft 17 that extends through the outer or closed end wall 18 of the cover 3. An operating member or knurled handle 19 is secured to the shaft 17 outside of the casing.

A bridge structure, secured to the base 2, extends across the front of the meter mechanism and comprises piers or studs 20 secured to the base 2 and a beam 21 secured to the studs 20, as by nuts 22.

A bushing element 23, secured in an opening in the beam 21, as by a peened flange 25, and having opposite end portions of different internal diameter to act as bearings for the shaft 17 and for a sleeve 26 on the handle 19, is exteriorly screw threaded for the reception of nuts 27 and 28 and contains a helical spring 30 disposed around the shaft 17 between the sleeve 26 and a shoulder 31 near the inner end of the bushing.

The nuts 27 and 28 are adapted to grip the wall 18 of the cover 3 through the intermediary of yieldable gaskets 32.

To reset the pointer 6, the handle 19 is pressed toward the cover wall 18 and turned about its axis. These movements first place the bent-arm portion 15 in the path of movement of the pointer 6 and then cause the portion 15 to engage the pointer 6 to return it to zero position. The spring 30 may have the double function of moving the shaft longitudinally and turning it to initial position, or either one of these functions alone, although, in certain aspects of the invention, it is preferred that the longitudinal movement always be present.

In a usual meter of this type, the studs 20 extend through the cover wall 18, thus requiring a plurality of accurately located relatively small openings in the cover and a plurality of the usual meter seals. The cover is also required to have an accurate fit relative to the base 2, and, where this cover is of glass, or is otherwise constructed and correspondingly subject to distortion during manufacture or cooling, the fit may be inaccurate and the stud openings misplaced.

Further, the distance between the base member 2 and the outer cover wall 18 may not always be the same in different meters of the same kind, and it is in this feature that the portion 15 may not be in proper relation to the pointer 6.

According to my invention, the disadvantages attending the securing of the cover, the positioning of the stud openings and the fitting of the resetting mechanism are all overcome by a simple adjustment of the nuts 27 and 28, as augmented, when necessary, by manipulation of the nuts 22.

When the parts are finally adjusted, a usual meter seal, consisting of a wire loop and a lead disk, may be positioned by placing the wire through an opening 33 in the sleeve 26. A similar seal may be positioned with its wire through openings 34 and 35, in the sleeve 23 and the nut 27, respectively, or otherwise suitably provided.

The form of my invention illustrated in Fig. 2, in which corresponding parts are designated by corresponding reference characters, is substantially the same as the structure of Fig. 1, except that a single-piece bridge is employed, instead of the bridge shown in Fig. 1 embodying the parts 20, 21 and 22. In Fig. 2, the bridge comprises a single integral member having a beam portion 38, piers 39 and lower pier-end portions 40 that are secured to the base 2, as by screws 42. The portions 40 may be mounted on relatively short studs, corresponding to the studs 20 of Fig. 1, or be otherwise adjustably mounted, as by the use of washers or shims.

While I have shown and described particular forms of my invention, changes may be made therein without departing from the spirit and scope thereof, as set forth in the appended claims.

I claim as my invention:

1. In combination, a casing including relatively movable members to provide access to the interior thereof, a mechanism supported in the casing on one of said members, and means operating through another of said members to hold said members in predetermined relation and to control an element of said mechanism, including an operating member exterior to the casing and an element in the casing for predetermined relation to said first element, and adjusting means for maintaining said relation irrespective of discrepancies in the relation of said casing members.

2. In combination, a casing including relatively movable members to provide access to the interior thereof, a mechanism supported on one of said members in the casing, and means operating through another of said members to hold said members in predetermined relation and to control an element of said mechanism, including an operating member exterior to the casing and an element in the casing for predetermined relation to said first element, and adjusting means for maintaining said relation irrespective of discrepancies in the relation of said casing members, including a member connected to said one casing member.

3. In combination, a casing including relatively movable members to provide access to the interior thereof, a mechanism supported on one of said members in the casing, and means constituting the sole means for holding said members together and operating through another of said members to control an element of said mechanism including an operating member exterior to the casing, an element in the casing for coaction with said first element, and adjusting means connected between said casing members for establishing said coaction irrespective of discrepancies in the relation of said casing members.

4. In combination, in a meter, a base, a meter mechanism thereon, a structure bridging the front of said mechanism between positions on said base, a cover of substantially cup-shape enclosing said mechanism and said bridge structure, and means cooperating between the cover and the bridge for holding the cover in position and controlling an element of said mechanism.

5. In combination, in a meter, a casing including a base and a movable cover, a meter mechanism on the base in the casing, and means including cooperating elements for holding the cover in position and controlling an element of said mechanism.

6. In combination, in a meter, a base, a meter mechanism thereon including an element to be reset, a structure bridging the front of said mechanism between positions on said base, a cover of substantially cup-shape enclosing said meter mechanism and said bridge structure with its open-end perimeter against the base, means cooperating between the bridge and the cover through the closed-end of the latter for holding the cover in position, and means operating through said holding means and supported thereby including an operating member exterior to the cover and an element inside the cover for resetting said reset element.

7. In combination, a casing including a base and a cover, a mechanism on the base in the casing, and means including cooperating elements for holding the cover in position and controlling an element of said mechanism.

8. In combination, a base, a mechanism thereon, a structure bridged between positions on said base, a cover, means cooperating between the bridge and the cover through the latter for holding the same in position, and means operating through said holding means for controlling an element of said mechanism.

In testimony whereof, I have hereunto subscribed my name this 27th day of Sept., 1920.

BERT G. LA BAR.